UNITED STATES PATENT OFFICE.

REINHOLD TSCHUNKE, OF BRESLAU, GERMANY, ASSIGNOR, BY MESNE ASSIGNMENTS, TO THE CHEMICAL FOUNDATION, INC., A CORPORATION OF DELAWARE.

PROCESS FOR PRODUCING SALTS OF THE N-METHYL-HEXAMETHENETETRAMIN.

1,336,709.       Specification of Letters Patent.       Patented Apr. 13, 1920.

No Drawing. Application filed January 19, 1914, Serial No. 813,066. Renewed June 26, 1919. Serial No. 306,920½.

*To all whom it may concern:*

Be it known that I, REINHOLD TSCHUNKE, a subject of the King of Prussia, German Emperor, residing at Breslau, in the Kingdom of Prussia, German Empire, have invented certain new and useful Improvements in Processes for Producing Salts of the N-Methyl-Hexamethenetetramin, of which the following is a specification.

Hexa-methenetetramin reacts with iodid of methyl to form hexamethenetetramin methyl iodid. From this reaction it has been observed that this reaction can be transferred to the other ethers of the methyl-alcohols, such as chlorid-bromid of methyl, sulfate of methyl, nitrate of methyl, rhodanite of methyl and the like and that in all cases, instead of hexa-methenetetramin, a mixture of the solutions of ammonia and formaldehyde or the products of the polymerization of the same can be used.

Another way for producing the salts of the N-methylhexamethenetetramin has been discovered through the observation that the salts of the monomethylamins react with hexamethenetetramin or with the mixture of the solutions of ammonia and formaldehyde or the products from the polymerization of formaldehyde thereby forming salts of the N-methylhexamethenetetramin. This reaction is particularly favorable if one molecule of salt of monomethylamin are heated in aqueous solution with three molecules of ammonia and six molecules of formaldehyde. Instead of starting from the salts of the monomethylamins the property of the formaldehyde could be used to methylate salts of ammonia according to the equation:

$$2NH_4X + 3CH_2O = 2NH_2(CH_3).HX + CO_2 + H_2O$$

X being a radical of an acid, so that therefore, with an excess of formaldehyde and with a sufficient quantity of ammonia the salts of ammonia can also be used for the formation of salts of the N-methyl-hexamethenetetramin; a process which can be expressed by the following equation:—

$$15CH_2O + 6NH_3 + 2NH_4X = 2C_6H_{12}N_4.CH_3X + CO_2 + 13H_2O.$$

This reaction can be modified in the widest limits for example by adding to the mixture, instead of the salts of ammonia, the corresponding quantity of ammonia and of free acid; and further by using, instead of the mixture of the solutions of ammonia and formaldehyde hexamethenetetramin which in presence of formaldehyde and free inorganic or organic acids or the ammonia salts of the same is also transformed into salts of the methyl base.

Since hexamethenetetramin, in presence of an acid, or the salts of the hexamethenetetramin separate formaldehyde when being boiled, a separate addition of formaldehyde is not even necessary for carrying out the above mentioned reaction, as in this case the separated formaldehyde will act for methylating the N. In this case the efficiency is not so good as with addition of formaldehyde. The formation of the salts of the N-methylhexamethenetetramin is generally expressed in the diagram:

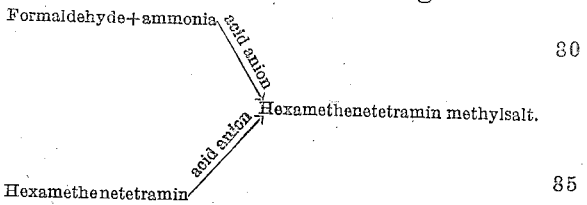

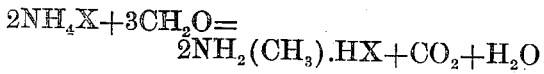

the formation of the salts being obtained after several hours of boiling.

Some of the salts of the methylhexamethenetetramin obtained according to the methods hereinbefore indicated, such as the sulfocyanite, or the borate are not easily soluble in cold water and they separate as crystals from the mixtures of the reaction when the same are cooling. Other salts, the negative acid radical of which does not stand long boiling in presence of formaldehyde, such as for example the bichromate, the ferrocyanate, the picrate, or the perchlorate can be separated as crystals from the mixtures of reaction, leading to the formation of very easily soluble salts of methylhexamethenetetramin, which consists of formaldehyde, ammonia and hydrochloric acid or sulfuric acid, if, after cooling, the corresponding anions are added, the separated compounds being not easily soluble in water. Most salts of the methylhexamethenetetramin are extremely easily soluble in water and it is very difficult to separate the same by direct process from the mixtures of the reaction of ammonia, formaldehyde and acid.

As such substances may be cited for example: the nitrate, chlorate, sulfate and the salts of organic acids. In these cases it is advisable to decompose the methylhexamethenetetramin salt by means of a solution of hydroxid of barium, whereby, after filtering, the solution of the free base $C_6H_{12}N_4CH_3OH$ is obtained which, evaporated in the vacuum, leaves a white liquefiable mass which easily absorbs carbonic acid.

By neutralizing the solution of this base with inorganic or organic acids and by subsequent evaporating—preferably in the vacuum—it is easy to obtain any desired salts of the same in pure state.

The free base $C_6H_{12}N_4CH_3OH$ can further be obtained by digesting the solution of hexamethenetetramin methyl chlorid, bromid, iodid or rhodanid with moist silver oxid, by filtering the same and evaporating in the vacuum.

Hereafter will follow the description of some salts of the methylhexamethenetetramin:— .

The rhodanid $C_6H_{12}N_4CH_3CNS$ represents a body which crystallizes in large colorless prisms, and melts, if slowly heated at 143°, in getting brown and in frothing. The compound is not easily soluble in cold water, easily soluble in warm water (at about 5%), very difficult to dissolve in alcohol, and almost insoluble in ether.

The meta borate of the particular composition ascertained by analysis to be $C_6H_{12}N_4CH_3OH.5HBO_2$ is a crystalline powder which is easily soluble in cold water, more difficult to dissolve in alcohol and almost insoluble in ether. It crystallizes from water in short prisms which are grouped like warts and which, over 200°, color gradually from yellow to brown, but do not yet melt at 300°. The aqueous solution reacts slightly alkaline.

The bichromate $(C_6H_{12}N_4CH_3)_2Cr_2O_7$ crystallizes from water in beautiful orange-red prisms which decomposes, when heated, in exploding. It is not easily soluble in cold water and even more insoluble in alcohol and absolutely insoluble in ether.

The perchlorate consists of large slabs very difficult to dissolve in cold water and decomposing with explosion when being heated.

The ferrocyanate, consists of a yellow crystalline deposit difficult to dissolve in cold water, the aqueous solution of which decomposes when being heated.

The picrate crystallizes from hot water in golden-yellow large prisms. The salts of organic acids, such as the acetate, salicylate and the like form not very characteristic, generally liquefiable white substances.

Most of the salts of the methylhexamethenetetramin react neutrally; a few, like the borate, react feebly alkaline. All possess the property of generating formaldehyde even in alkaline media if they are heated. Through this property as well as through the neutral to feebly alkaline reaction the salts of the methylhexamethenetetramin differ from the salts of the hexamethenetetramin which have of course an acidic reaction and do not separate formaldehyde when being in alkaline solutions.

Example No. I: A mixture of 1.8 kilograms of trioxymethylene and 2.72 kilograms of an ammonia solution, of 25% is heated while being continuously stirred and cooled until the trioxymethylene has dissolved, whereupon 1.26 kilograms of methyl sulfate is added and heated, until the film of oil has disappeared. Hereafter 0.97 kilogram of rhodanid of potassium is added. When the mixture cools the rhodanid compound separates in beautiful crystals of a melting point of 193°.

Example No. II: 1.4 kilograms of hexamethenetetramin are dissolved in 2 kilograms of water and 9.75 kilograms of methyl rhodanid are added to the solution. The mixture is maintained boiling while being continuously stirred, cooled and conducted back to the retort until the methylrhodanid has been consumed. When cooling the mixture separates hexamethenetetramin-methyl rhodanid.

Example III: 5.14 kilograms of a solution of formaldehyde at 35% are rapidly poured into a mixture of 2.04 kilograms of a solution of ammonia of 25% and of 0.9 kilograms of methylamin rhodanid. There will take place at once, at a considerable increase of temperature, formation of the hexamethenetetramin-methylrhodanid. To complete the reaction the solution is further heated at 100° for one hour.

Example IV: 12.85 kilograms of a solution of formaldehyde of 35% are rapidly poured into a mixture of 4.08 kilograms of a solution of ammonia of 25% and of 1.52 kilograms of ammonium rhodanid. The mixture of reaction gets very hot and is maintained boiling slowly during five hours with simultaneous cooling and conducting back to the retort. When cooling the hexamethenetetramin-methyl rhodanid separates in large prisms.

Example V: 1.4 kilograms of hexamethenetetramin together with 1.46 kilograms of hydrochloric acid of 25% and 2.5 kilograms of water are heated for two hours at a temperature of 100°. To the cooled mixture of reaction 6.76 kilograms of ammonium rhodanid are added, whereupon the not easily soluble hexamethenetetramin-methyl rhodanid separates at once. Instead of the 0.76 kilogram of ammonium rhodanid, 1.23 kilograms of perchlorate of potassium or 2.3 kilograms of picric acid can be added to the mixture from reaction, whereby the salts of the methylhexamethenetetramin will separate which correspond with the acid radicals.

Example VI: 100 grams of hexamethenetetramin rhodanid of a percentage of sulfocyanic acid analytically fixed at 29.63% (calculated for $C_6H_{12}N_4HCNS$ 29.66%) are boiled with 300 grams of water for five hours. The mixture from reaction, which at the beginning is clearly acidic, becomes neutral at about the end of the reaction. When cooling the hexamethenetetramin-methyl rhodanid separates in large prisms, the percentage of sulfocyanic acid of which was found to be 27.47% (calculated for $C_6H_{12}N_4CH_3CNS$ 27.71%).

Example VII: To a mixture of 6.5 kilograms of a solution of formaldehyde of 35% and 2.04 kilograms of aqueous ammonia of 25% 1.86 kilograms of boric acid is added and the mixture is boiled during eight hours, whereupon the liquid mixture is concentrated by evaporation to about half its original volume. From the cooled residue the borate separates in crusts settling on the wall of the vessel and it can be recrystallized from little water to be purified.

Example VIII: Into a mixture of 5.3 kilograms of ammonia of 25% and of 12.5 kilograms of a solution of formaldehyde of 35% 1 kilogram of concentrated sulfuric acid is poured and heated for 3-4 hours. The cooled mixture from reaction is admixed with a concentrated aqueous solution of 2.6 kilograms of bichromate of sodium whereupon at once a yellow crystallized deposit separates which is not easily soluble and which is recrystallized from hot water so as to be purified. When cooling beautiful orange-red prisms are separated of a composition $(C_6H_{12}N_4CH_3)_2 Cr_2O_7$. If 2.6 kilograms of this bichromate are intimately mixed with 6.3 kilograms of barium hydroxid $(Ba(OH)_2 8H_2O)$ and 6 kilograms of water, the pulp deposits after a short time as yellow bariumchromate in developing hexamethenetetramin-methylhydroxid.

The aqueous, absolutely colorless solution of this base is pressed out of the insoluble bariumchromate and evaporated in the vacuum after removal of any small excess of bariumhydroxid which it may contain by means of the required quantity of sulfuric acid, the residue forming a white easily liquefiable mass, from which any salts of the base can be got by neutralization with inorganic or organic acids.

I claim:—

1. Process for the manufacture of salt of the N-methyl hexamethenetetramin consisting in submitting hexamethenetetramin yielding mixtures of ammonia and formaldehyde to heat with methylizing agents in the presence of acid anions for a considerable time and bringing the products of reaction to crystallization.

2. Process for the manufacture of salt of the N-methyl hexamethenetetramin consisting in submitting hexamethenetetramin yielding mixtures of ammonia and formaldehyde to heat with methylizing agents in the presence of acid anions for a considerable time, treating the mixtures of reaction with metal salts and crystallizing the same.

In witness whereof I have hereunto set my hand in the presence of two witnesses.

REINHOLD TSCHUNKE.

Witnesses:
SIEGFRIED LUSTIG,
ERNST KATZ.